United States Patent [19]

Wahls

[11] 4,289,351
[45] Sep. 15, 1981

[54] LOW PROFILE TRUCK SEAT

[75] Inventor: Robert J. Wahls, Spring Grove, Ill.

[73] Assignee: The Freedman Seating Company, Northbrook, Ill.

[21] Appl. No.: 80,281

[22] Filed: Oct. 1, 1979

[51] Int. Cl.³ .............................. B60N 1/06; B60N 1/08
[52] U.S. Cl. .................................... 297/307; 248/429; 248/564
[58] Field of Search ............... 248/429, 430, 561, 562, 248/564, 569, 573, 636, 419; 297/216, 307

[56] References Cited

U.S. PATENT DOCUMENTS

| | | | |
|---|---|---|---|
| 1,767,757 | 6/1930 | Harris | 297/307 |
| 2,986,199 | 5/1961 | Ferreira et al. | 248/429 X |
| 3,314,672 | 4/1967 | Persson | 297/307 |
| 3,442,552 | 5/1969 | Lehner | 297/307 X |
| 3,532,379 | 10/1970 | Reilly et al. | 297/307 X |
| 3,572,624 | 8/1969 | Holdampf et al. | 248/564 |
| 3,806,190 | 4/1974 | Winslow | 297/216 |
| 3,897,036 | 7/1975 | Nystrom | 248/564 |
| 4,128,217 | 12/1978 | Mazelsky | 297/216 |

Primary Examiner—James T. McCall
Attorney, Agent, or Firm—Alter and Weiss

[57] ABSTRACT

A low profile seat for vehicles features structural geometry which enables the use of an air spring to control seat height and rate in vehicles whose interior dimensions does not provide for the placement of a more conventional air spring vehicle seat. A fore-and-aft vibration absorbing system may be selectively engaged or disengaged to provide for further driver comfort.

9 Claims, 9 Drawing Figures

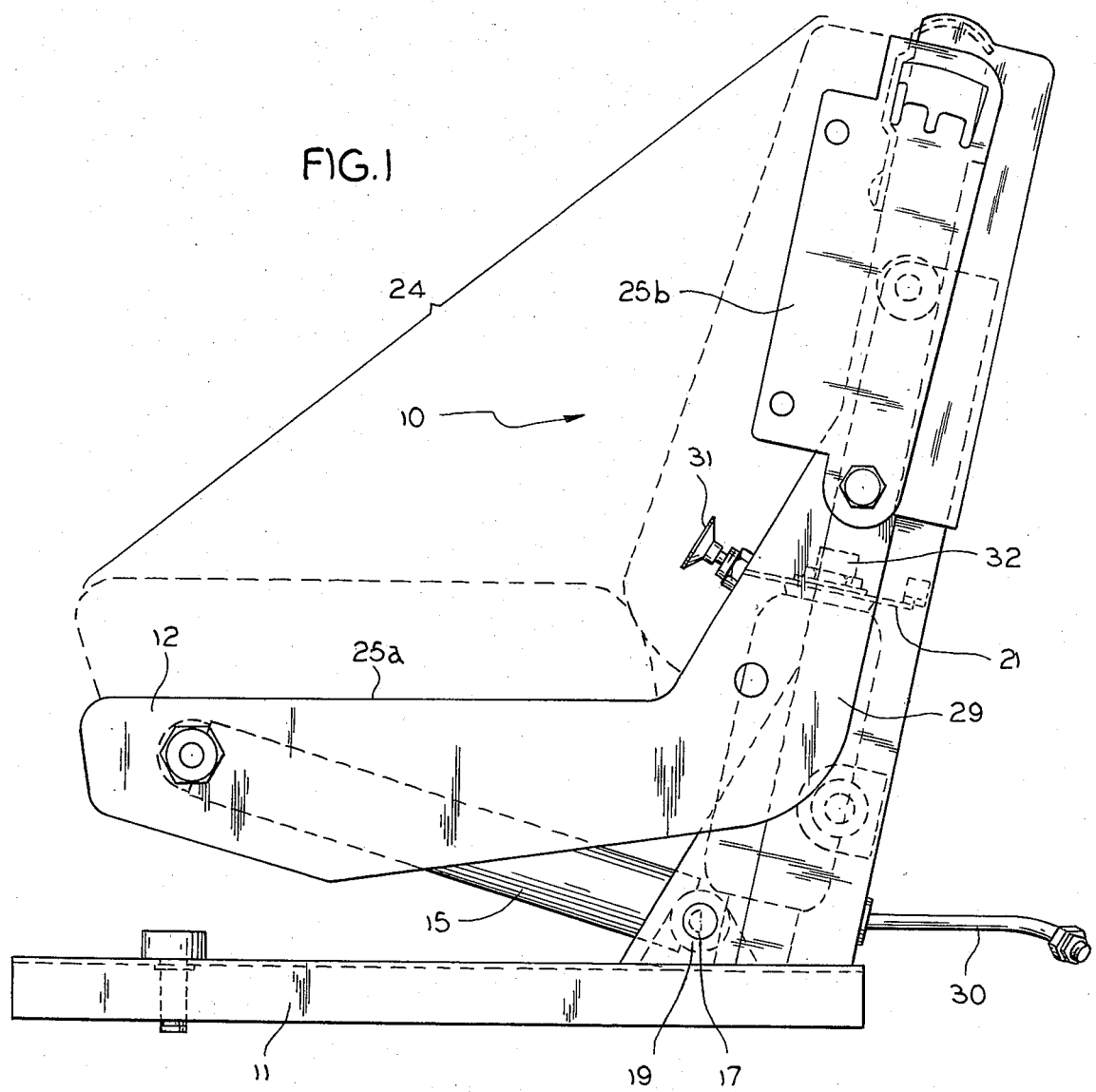
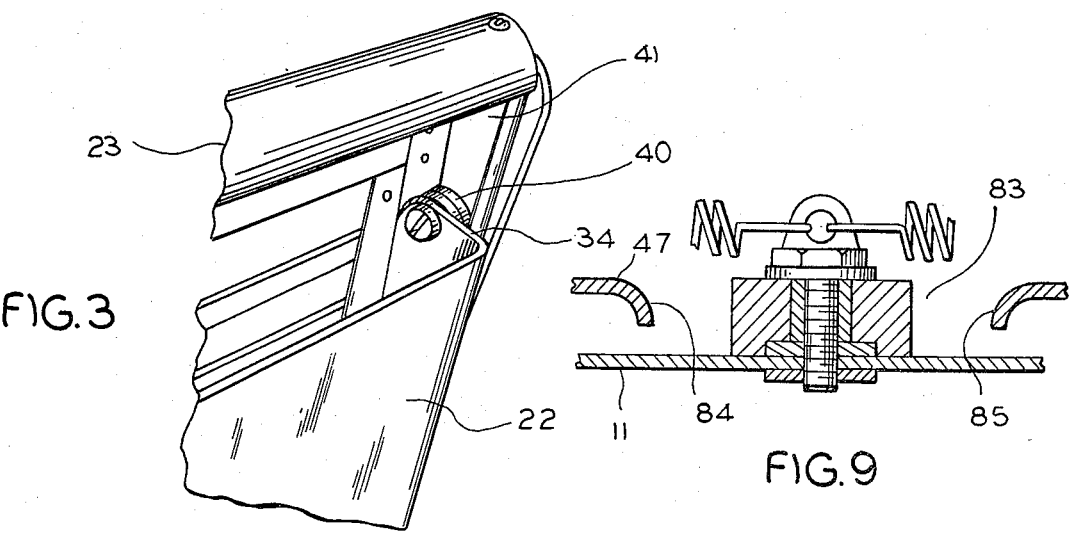

LOW PROFILE TRUCK SEAT

The present invention relates generally to seats for vehicles, and more particularly, to a seat adapted for use in trucks having cab dimensions or configurations which do not allow for the placement therein of a more conventional base-and-pedestal seat configuration.

Providing comfortable seating for drivers of over-the-road vehicles is essential to eleviate fatigue brought on by long stretches of driving. A fatigued driver is more likely to make an error in judgment which may result in an accident, and therefore providing seats which serve to absorb some of the shocks and vibrations encountered during driving has become an important factor in vehicle design and construction.

Seats such as those disclosed in U.S. Pat. No. 3,599,232 are well known in the art, and feature a base connected to a seating pedestal by a linkage structure, which enables the pedestal, and thereby the seat, to move with respect to the base. To effect and control such movement, devices such as air springs are well known and have often been used. Such air springs provide convenient means for not only adjusting the height of the seat to a driver's individual preferences, but also establish a seat rate, or rate of deflection through which the seat may controlledly move when encountering shocks, vibrations, bumps, and the like during driving.

Where the design or cab dimensions of a vehicle make it impossible to accommodate such a seat structure, driver comfort is often necessarily sacrificed. A prevalent example of one such vehicle is the "cab-over" type of truck cab commonly used to pull trailers. The term "cab-over" refers to the fact that the entire cab structure is hinged to the front of the truck whereby the entire structure may be tilted forward to expose the engine and other mechanical components for ease in servicing. Such a construction, however, dictates that the driver's seat be placed directly above the front axle of the truck, and the required cab configuration necessary to clear the front wheels of the cab makes it impossible to accommodate a base-and-pedestal type seat construction exemplified hereinabove. Thus, the seats commonly provided for cab-over trucks must be constructed such that the seating surface is in close proximity to the floor of the truck cab.

In the past, it has been extremely difficult to construct any such seat with provision for driver comfort. Further complicating such a situation is the fact that placing the driver's seat directly above the front axle subjects the seat to more severe vibrations and shock than in a non-cab-over truck. At highway speeds, such shocks and vibration are lessened, however, a great proportion of semi-trailer driving is done in heavy traffic or within large cities, and the constant stop-and-go of the truck causes a great deal of vibration and driver fatigue.

Another consideration affecting driver comfort involves vibrations which have horizontal components, as well as vertical components. Such vibrations may be defeated by allowing the vehicle seat to float freely in a fore-and-aft direction, with provision for resiliently isolating the back and forth movement of the truck cab, from the driver. Traffic conditions, such as those involving a great deal of stop-and-go driving may also require that such a system be selectively disengagable, and that such disengagement be conveniently and simply carried out by the driver without leaving the seat or taking his attention from his driving.

Accordingly, the need exists for a truck seat of low profile construction which provides for the same type of driver comfort as the larger, more conventional base-and-pedestal seat construction.

My invention, has, therefore, the following objects:

To provide seat structures for vehicles having limited or restricted cab space;

To provide such seats with adjustable vibration-absorbing capacities;

To provide such seats with structural geometry accommodating the use of an air spring to regulate seat rate and adjustability;

To provide such structures in forms simple to maintain and economical to manufacture; and To provide such seats with selectively engagable fore-and-aft vibration absorbing structure.

These and further objects will become more apparent upon a consideration of the accompanying drawings wherein:

FIG. 1 is a side view of a vehicle seat embodying the present invention;

FIG. 3 is a partial perspective view illustrating the track and roller assembly;

FIG. 9 is a view along 9—9 of FIG. 5.

Figure 2:
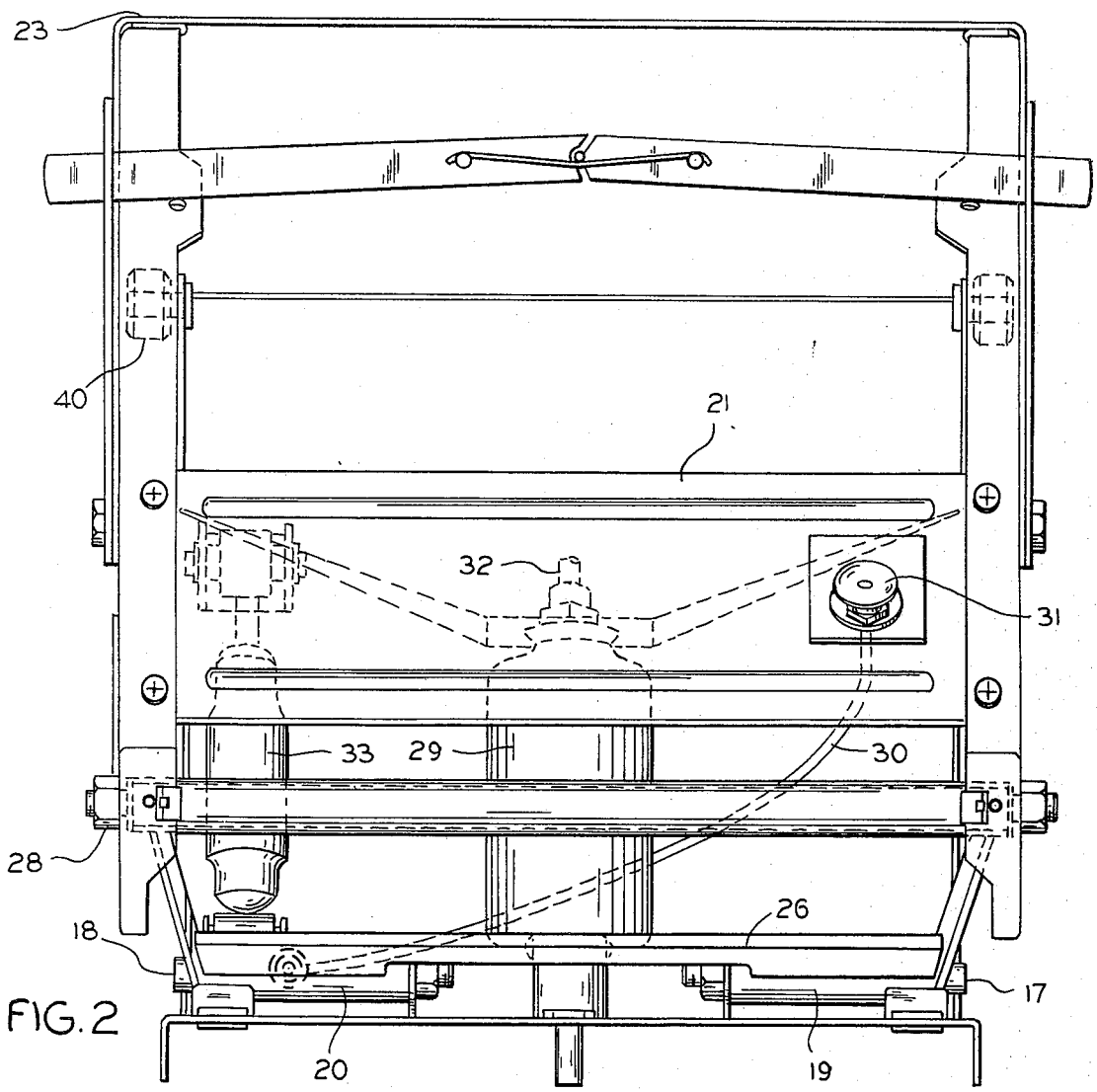
FIG. 2 is a front partial section of the apparatus in FIG. 1.

Consistent with the foregoing objects, a preferred embodiment of the present invention includes structure provided in a vehicle seat for vehicles of limited floor-to-seat clearance enabling use of air spring suspension components, said structure including a base plate 11 to which parallel link arms 15 and 16 are pivotally connected, spaced apart frame members 12 and 13 pivotally connected to said link arms, said frame members joined together by transverse spring support plate 21 and seat back rail 23, said seat frame members 12 and 13, said support plate 21 and said seat back rail 23 defining a pedestal for attachment thereto of seat cushions shown in phantom, an air spring 29 secured at one end to base plate 11, and at its other end to spring support plate 21 whereby said air spring 29 may be used to raise and lower said pedestal with respect to said base plate 11, a back plate 22, attached to said floor plate 11 and extending upward roughly parallel to and within said frame members 12 and 13, means 33 to damp the movement of said pedestal, said damping means attached at one end of said seat back rail 23 and at the other end to said back plate 22, means to guide said frame members 12 and 13 along said back plate 22 when said pedestal is raised and lowered, and means to selectively enable said base plate 11 to respond to vibrations incurred in a fore-and-aft direction with respect to the floor of said vehicle, said vibration responsive means including track assembles 42 enabling fore-and-aft motion of said pedestal, springs 56 and 57, spring bumper 64, and sector plate 61 to selectively engage and disengage said vibration responsive system.

Referring now to FIG. 1, the numeral 10 indicates generally a low profile air suspension vehicle seat having a base plate 11, parallel frame members 12 and 13 spaced apart and joined by front pivot brace 14, spring support plate 21, and seat back rail 23. Thus assembled, said structure defines a seat frame 24 having a seat 25a and back 25b to which seat cushions shown in phantom are customarily attached.

Rear pivot bushings 19 and 20 are integrally attached to rear brace 26 which, in turn, is attached to base plate 11. Frame member 12 is pivotally attached to base plate 11 by pivot shaft 17 at rear pivot housing 19; in like manner, frame member 13 is pivotally attached to base plate 11 by pivot shaft 18 at rear pivot housing 20. The forward ends of arm and back frame members 12 and 13 are joined together by front pivot brace 14 and are pivotally connected thereto by front pivot shaft 28.

Back plate 22 is attached to base plate 11, and extends upwardly in parallel relationship to back segment 25, and is positioned between frame members 12 and 13 as said frame members extend upward.

Figure 4:
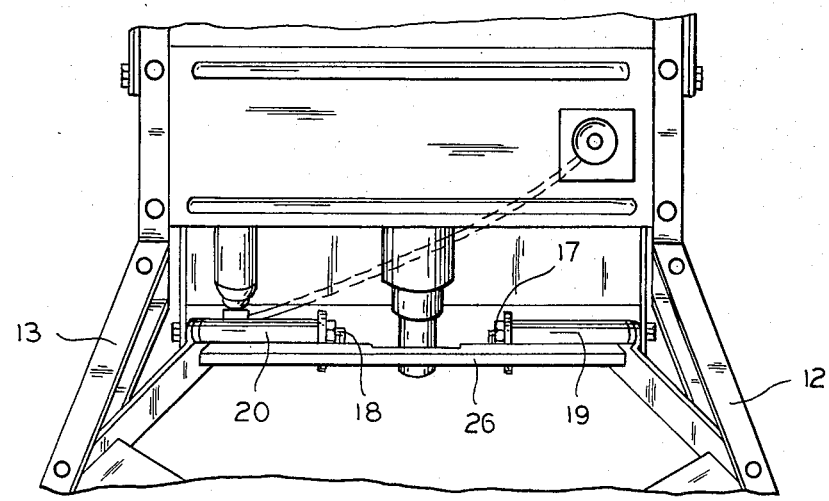
FIG. 4 is a partial perspective view of the rear pivot structure of the present invention.

In order to cushion upward and downward movement of pedestal 24 with respect to base plate 11, an air spring 29 is provided, anchored at its lowermost end to base plate 11 as best seen in FIG. 4, and at its uppermost end to spring support plate 21, as best seen in FIG. 1. Compressed air is supplied to air spring 29 via air supply line 30 and may be controlled by valve 31 in any conventionally known manner found to be convenient.

Thus, as compressed air is allowed to enter air spring 29, and air spring shaft 32 extends outwardly to exert force on spring support plate 21, air spring 29 will cushion seat frame 24 as it moves in a substantially vertical direction, with frame members 12 and 13 pivoting about front pivot brace 14 and rear pivot housings 19 and 20. Air may be inserted or exhausted from air spring 29, enabling the driver of a vehicle to set the seat for comfortable driving. Such a construction avoids the geometry required by seats such as that disclosed in U.S. Pat. No. 3,599,232, requiring the air spring to be positioned beneath seat 25a.

For additional stability and driver comfort, damper 33 is provided to act as a shock absorber for the purpose of damping short upward and downward movements of seat 25a caused by shocks and bumps incurred during driving. Damper 33 is anchored to back plate 22 by anchor bolt 35 passing through damper bracket 36, as best seen in FIG. 2. Damper 33 is anchored to linkage arm 15 by bracket 37, bolt 38, and locknut 39. Thus, the upward and downward movement of seat 25a and back 25b is damped by the movement of damper shaft 37 as it is drawn inward and moved outward from damper 33. As herein illustrated, damper 33 may preferably be a conventional hydraulic shock absorber.

The upward and downward movement of seat frame 24 is facilitated by rollers, such as those illustrated at 40 of FIG. 2 and FIG. 3. In a preferred embodiment, rollers 40 are anchored to side wall 34 of back plate 22, and ride in channels such as that illustrated at 41 of FIG. 3 formed as an integral segment of frame members 12 and 13. The upward and downward movement of seat 25a and back 25b is thus restrained to a linear movement along channels 41, thus helping to maintain seat 25a in a horizontal position throughout its range of adjustment.

It has been found that drivers of large vehicles experience shocks and vibrations in not only a vertical direction, but horizontally as well. Such vibrations are magnified in the cab-over type truck due to the height above the ground that the truck seats are positioned and due to the fact that the seat is most often situated directly above the front axle of the truck on the wheel-well structure.

Accordingly, the present invention includes a system for absorbing the fore-and-aft vibrations to which drivers of such trucks are customarily subjected. A preferred embodiment of this system is best illustrated at FIGS. 5 and 6.

Figure 6:
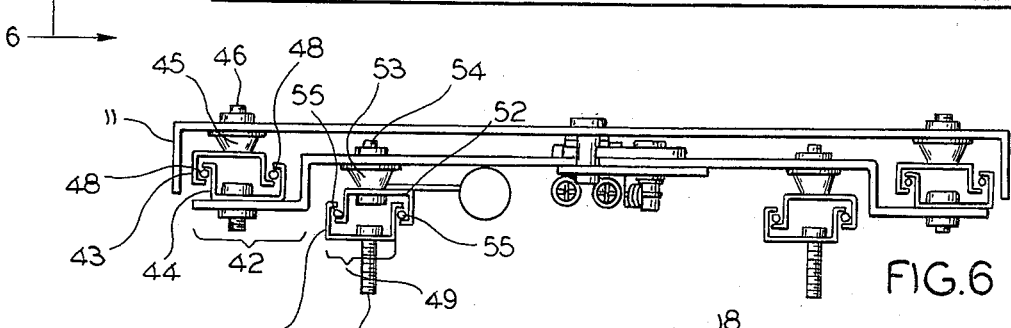
FIG. 6 is a view along 6—6 of FIG. 5.

As best seen in FIG. 6, base plate 11 is mounted to base plate glide assemblies 42. In this preferred embodiment, each base plate glide assembly includes an upper track 43 and a lower track 44, with upper track 43 being secured to base plate 11 at bushing 45 and mounting bolt 46. Lower track 44 is similarly secured to isolator plate 47. Bearings 48 are disposed within base plate glide assembly 42 to facilitate lower friction fore-and-aft movement of base plate 11 with respect to floor mounting plate 47.

In like fashion, floor plate glide assembly 49 are provided to secure floor mounting plate 47 to the floor of the vehicle in a manner which allows fore-and-aft gliding movement. Lower track 50 is secured to the vehicle floor by floor bolt 51. Upper track 52 is secured to the underside of floor isolator plate 47 via bushing 53 and bolt 54. Bearings 55 provide for relative movement of upper track 52 with respect to lower track 50, as in the base plate glide assembly 42 hereinabove described.

Figure 5:
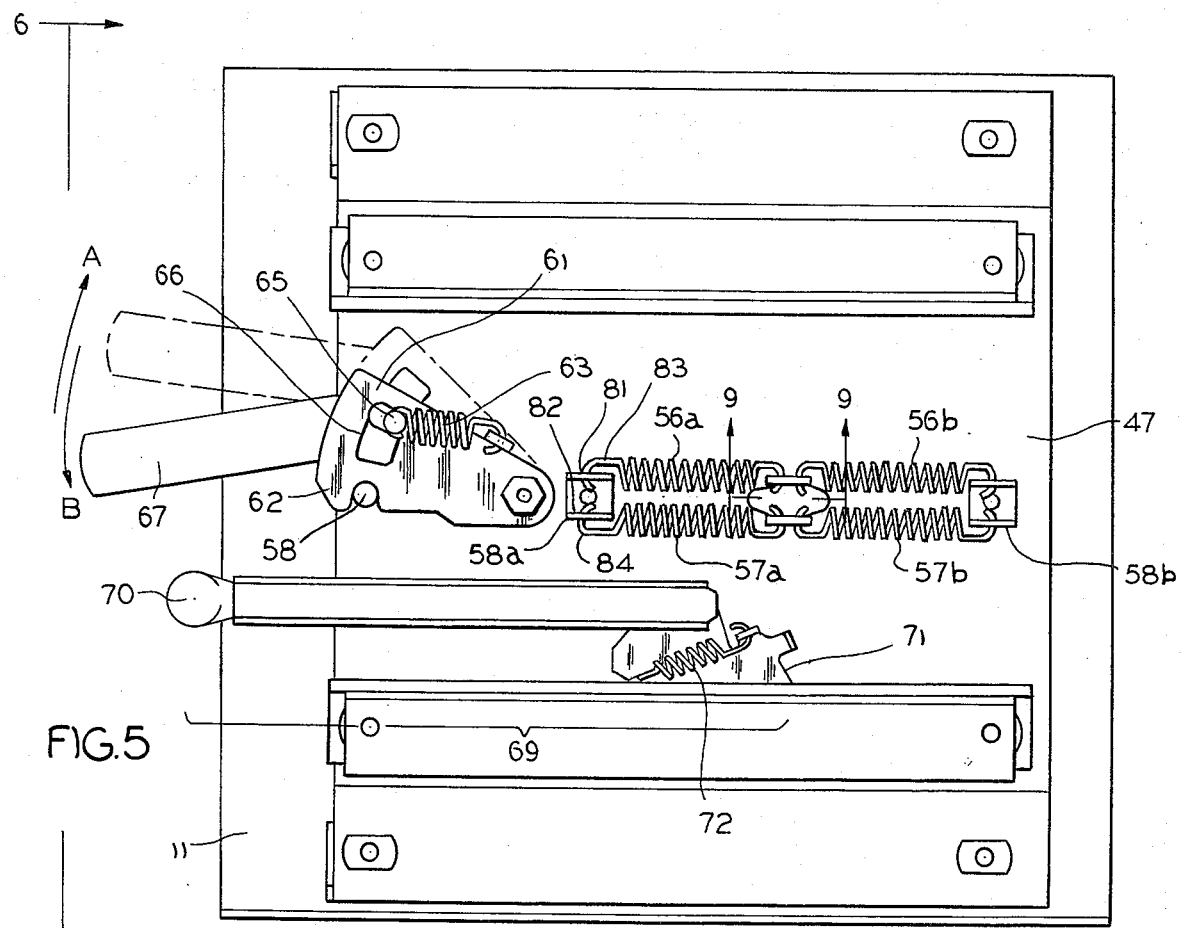
FIG. 5 is a bottom view illustrating the bottom glide and lockout assembly.
Figures 7, 8:
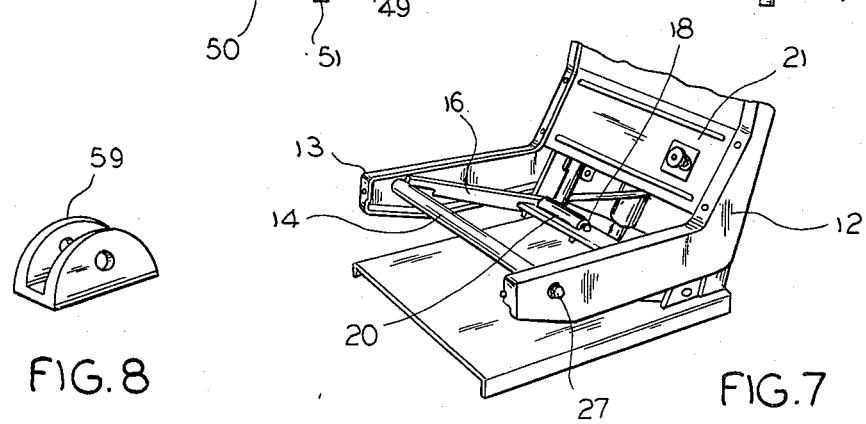
FIG. 7 is a partial perspective of the apparatus of FIG. 1 illustrating the seat linkage.
FIG. 8 is a perspective view of one of the brackets shown in FIG. 5.

In order to isolate the fore-and-aft travel of base plate 11 with respect to the floor of the vehicle, an isolator system is provided, as best seen in FIGS. 5 and 8. In the preferred embodiment herein presented, pairs of opposed springs as typified by forward spring 56a and rear spring 56b, and forward spring 57a and rear spring 57b are used to maintain base plate 11 in a substantially constant horizontal position during such vibration.

Forward spring 56a and 57a are anchored, at their forward ends, to forward spring bracket 58a, bolted to isolator plate 47. In like fashion, rear springs 56b and 57b are anchored at their rearmost ends, respectively, to rear spring bracket 58b, which is also attached to isolator plate 47.

The rearward ends of springs 56a and 57a and the forward ends of 56a and 57b are secured to base plate channel 59. As herein described and exemplified, attachment of springs 56a, 56b, 57a and 57b is accomplished by forming the end of each said spring into an open hook configuration, as typified at "C" of FIG. 5. As illustrated in FIG. 8, bracket 58a may be fashioned with a base 78 and an upstanding pair of oppositely disposed ears 79 and 80, said ears having apertures 81 and 82 formed respectively therethrough. As seen in FIG. 5, hooks 83 and 84, formed on springs 56a and 57a, respectively, engage bracket 58a through apertures 81 and 82. This means of securement, in the embodiment herein presented, may also be used to describe the means of attachment of said springs to rear bracket 58b and base plate channel 59.

As best seen in FIGS. 8 and 9, rubber bumper 60 is positioned within base plate channel 59. Bolt 76 and locknut 77 are thereupon used to anchor channel 59 and bumper 60 to base plate 11.

Also as seen in FIG. 9, isolator plate 47 has window 83 formed therethrough to enable channel 59 and bumper 60 to protrude upward to engage springs 56a, 56b, 57a and 57b. As seen in FIG. 9, the forward edge 84 and rearward edge 85 of window 83 are curved downward. The dimensions of window 83 and the shape of said edges 84 and 85 may be selected to limit the maximum fore-and-aft travel of isolator plate 47 with respect to base plate 11. By way of illustration, a large rearward displacement of base plate 11 with respect to isolator plate 47 will bring rear edge 85 into contact with bumper 60. This feature serves to protect the isolation system from metal-on-metal contact caused by maximum isolator plate travel during hard braking, in emergencies, or while encountering substantially rugged road conditions.

It has been found that during certain types of driving or over certain types of road surfaces, excessive fore-and-aft movement may be experienced. Accordingly, the present invention includes provision for selectively engaging or disengaging the fore-and-aft vibration absorbing system.

As best illustrated in FIG. 5, lockout sector plate 61 is provided, and is pivotally mounted at one end to isolator plate 47. Sector plate 61 is provided with cutout 62 sized and shaped to engage front lock pin 58, which is attached to base plate 11, and moves in slot 62a of isolator plate 47, as seen in FIGS. 5 and 6. Sector plate spring 63 is mounted at one end to sector plate 61, at 64, and at its other end is mounted to spring pin 65, which is attached to lockout lever 67. Cutout 66, formed through sector plate 61 enables sector plate 61 through an arc sufficient to disengage cutout 62 from front lock pin 58. To accomplish this movement in a convenient manner, lockout lever 67 is pivotally attached to sector plate 61 and extends forward to enable the driver to operate lockout lever 67 while seated.

When lockout lever 67 is moved to the position indicated in phantom at FIG. 5, the fore-and-aft vibration isolating assembly is operative, and base plate 11 will move responsive to fore-and-aft vibrations with respect to the floor of the vehicle. When lockout lever 67 is moved towards the position in solid at FIG. 5, sector plate spring 63 urges sector plate 61 to engage front lock pin 58 at some point along segment 68 of sector plate 61. When base plate 11 has moved a sufficient distance to align front lock pin 58 with cutout 62, spring 63 will automatically engage sector plate 61 with front lock pin 58 thereby "locking out" the fore-and-aft vibration absorbing feature of the present invention. In this manner, it is not necessary for cut-out 62 and front lock pin 58 to align precisely when the driver intends to lock out the system; engagement will occur when lockout lever 67 is moved to engage front lock pin 58 with segment 68, and base plate 11 has thereafter moved sufficiently to effect alignment.

Also provided, as illustrated in FIG. 5, is a fore-and-aft seat positioning assembly 69 which enables the driver to adjust the position of base plate 11 with respect to floor mounting plate 47. Such an adjustment is old and well known in the art, and is herein illustrated as including adjustment lever 70, lock plate 71, and spring 72.

Use of the present invention may be conveniently described as follows. Seat assembly 10 is intended to be mounted in such vehicles as cab-over trucks where, typically, the seats are mounted upon the wheel-well of the truck, leaving an extremely limited amount of space between the seat and the surface to which it is mounted.

Upon entering the vehicle and seating himself, the driver may use air valve 31 to adjust seat 25a to his or her own personal comfort. Use of seat frame assembly 24 facilitates such adjustment by providing a seat frame pivotable at front pivot 14 and rear pivots 19 and 20, and guided in its up-and-downward movement by rollers 40 moving within guides 41, all without requiring air spring 29 to be situated beneath seat 25a.

After the vehicle has left stop-and-go traffic, the driver may engage the fore-and-aft vibration isolating system by moving lockout lever 67 in direction A, as shown in FIG. 5. To disengage the system, lockout lever 67 is moved in direction B until sector plate 61 encounters front lock pin 58 at either cutout 62 or segment 68. When cutout 62 is aligned with front lock pin 58, the system will be disengaged. If, however, as will more likely be the case, front lock pin 58 meets segment 68, lockout spring 63 will automatically engage front lock pin 58 and cutout 62 when base plate 11 moves sufficiently to align them, with no further attention required by the driver.

Although the foregoing description has concentrated primarily upon use of the present invention as a driver's seat, it is to be understood that the structural vagaries of truck cabs also may include configurations which, while enabling use of a more conventional pedestal-and-seat type construction on the driver's side of the cab, will still require a seat of limited top-to-bottom dimension on the passenger side. In such a situation, the present invention may also be utilized as a passenger seat as well.

While the foregoing has presented certain specific embodiments of the present invention, it is to be understood that these embodiments are presented by way of example only. It is expected that others skilled in the art will perceive variations which, while differing from the foregoing, do not depart from the spirit and scope of the invention as herein described and claimed, and no limitation of said invention is hereby intended by any of the foregoing descriptions, as, for example, the substitution of mechanical components for hydraulic or pneumatic components, or vice versa.

I claim:

1. A suspension system for a vehicle seat of the type mounted to the floor of a vehicle, said suspension system cushioning said vehicle seat against shocks and isolating said seat from vibration, said suspension system comprising:

a horizontally extending base plate assembly attached to said floor, said base plate assembly having front and rear edges;

an upwardly extending back plate, said back plate integral with said base plate assembly proximate said rear edge of said base plate assembly;

a seat, said seat including parallel spaced-apart side frame members defining a generally horizontally extending seating surface, and a seat back extending generally upwardly therefrom, said seat further including means to pivotally link said seat to said base plate assembly, said link means including at least one link arm extending from said base plate assembly to said seat;

means to cushion said seat from shocks, said cushioning means including air suspension means to resiliently suspend said seat above said base plate assembly, said air suspension means having a first end attached to said base plate assembly and a second end attached to said seat, said air suspension means positioned rearward of said seating surface to situate said seat proximate said base plate assembly; and said base plate assembly including means to isolate said seat from vibrations and shock.

2. The apparatus as recited in claim 1 wherein said air suspension means includes an air spring, said air spring being attached at one end to said base plate assembly, and at the other end to said seat back.

3. The apparatus as recited in claim 1 wherein said isolating means includes a first set of tracks, said first tracks attached to and extending along said vehicle floor in a fore-and-aft direction;

a second set of tracks slidably cooperating with said first set of tracks, said second set of tracks attached to said base plate assembly;

means to selectively allow movement of said base plate assembly with respect to said vehicle floor responsive to the motion of said vehicle during normal driving operations; and means to damp the travel of said base plate assembly with respect to said vehicle floor.

4. The apparatus as recited in claim 3 including means to lock said base plate assembly to prevent movement thereof relative to said vehicle floor along said first set of tracks.

5. The apparatus as recited in claim 3 wherein said damping means includes a plurality of springs, each said spring having a first end and a second end;

each of said first spring ends being secured to said base plate assembly, a first set of said springs extending in a forward direction, and having the second end thereof attached to said floor, a second set of said springs extending in a rearward direction and having the second end thereof attached to said floor.

6. The apparatus as recited in claim 5 wherein each said set of springs comprises two springs.

7. In a seat suspension for support of vehicle seats, said seats of the type having a seat frame with a seat segment and a back segment, a base, and a linkage pivotally connecting said seat frame and said base, the improvement comprising:

means to isolate said seat frame from shocks and vibrations, said isolating means including a plurality of upper track members, said upper track members attached to the underside of said base and extending in a fore-and-aft direction;

a plurality of lower track members slidingly cooperating with said upper track members;

understructure attaching said lower track members to said vehicle floor;

a forward set of springs, said forward spring set attached at one end of said understructure and extending forward therefrom to be attached at its other end to said base;

a rear set of springs, said rear spring set attached at one end to said understructure and extending rearward to be attached at its other end to said base.

8. The apparatus as recited in claim 7 wherein each said spring set comprises two springs.

9. The apparatus as recited in claim 7 wherein said isolating means further includes means to lock said base to said understructure to disengage said isolating means.

* * * * *